United States Patent
Li et al.

(10) Patent No.: US 9,112,267 B2
(45) Date of Patent: Aug. 18, 2015

(54) METHOD OF ACCESSING A WIRELESS NETWORK AND A WIRELESS DEVICE

(75) Inventors: Li Li, Edison, NJ (US); Thomas Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 559 days.

(21) Appl. No.: 13/270,564

(22) Filed: Oct. 11, 2011

(65) Prior Publication Data

US 2013/0089008 A1  Apr. 11, 2013

(51) Int. Cl.
| | | |
|---|---|---|
| *H04B 7/00* | (2006.01) |
| *H04W 4/00* | (2009.01) |
| *H01Q 1/24* | (2006.01) |
| *H04W 76/00* | (2009.01) |
| *H04W 88/08* | (2009.01) |
| *H04W 84/08* | (2009.01) |

(52) U.S. Cl.
CPC .............. *H01Q 1/246* (2013.01); *H04W 76/00* (2013.01); *H04W 84/08* (2013.01); *H04W 88/08* (2013.01)

(58) Field of Classification Search
CPC ..... H04W 72/04; H04W 76/00; H04W 84/08; H04W 88/08
USPC .......................................... 370/277, 329, 341
See application file for complete search history.

(56) References Cited

U.S. PATENT DOCUMENTS

| 5,784,362 | A  * | 7/1998  | Turina ........................... 370/321 |
| 6,587,672 | B1 * | 7/2003  | Chuah et al. .................... 455/69 |
| 2006/0126570 | A1 * | 6/2006  | Kim et al. ...................... 370/335 |
| 2006/0239239 | A1 * | 10/2006 | Yang ............................. 370/342 |
| 2008/0051098 | A1 * | 2/2008  | Rao ............................ 455/452.1 |
| 2008/0233992 | A1 * | 9/2008  | Oteri et al. .................... 455/522 |
| 2009/0016296 | A1 * | 1/2009  | Jechoux et al. ............... 370/331 |
| 2010/0142470 | A1 * | 6/2010  | Park et al. ..................... 370/329 |
| 2011/0194478 | A1 * | 8/2011  | Lee et al. ...................... 370/312 |
| 2011/0230179 | A1 * | 9/2011  | Lee et al. .................... 455/422.1 |
| 2012/0100851 | A1 * | 4/2012  | Zheng et al. .................. 455/436 |
| 2012/0254890 | A1 * | 10/2012 | Li et al. ........................ 719/313 |
| 2013/0223235 | A1 * | 8/2013  | Hu et al. ....................... 370/242 |

OTHER PUBLICATIONS

3GPP TS 36.213, $3^{rd}$ Generation Partnership Project: Technical Specification Group Radio Access Network; Evolved Universal Terrestrial Radio Access (E-UTRA); Physical Layer Procedures (Release 8), Sep. 2009.

* cited by examiner

*Primary Examiner* — Kodzovi Acolatse
(74) *Attorney, Agent, or Firm* — Harness, Dickey & Pierce, P.L.C.

(57) ABSTRACT

In one embodiment, this method includes sending, from a terminal, a random access request; and receiving, at the terminal, system information from a base station via a unicast transmission in response to the random access request. The system information includes an identifier, uplink bandwidth information and downlink bandwidth information. The identifier identifies the base station, the uplink bandwidth information indicates a bandwidth to use for uplink transmission, and the downlink bandwidth information indicates a bandwidth used for downlink transmission.

9 Claims, 8 Drawing Sheets

METHOD OF ACCESSING A WIRELESS NETWORK AND A WIRELESS DEVICE

BACKGROUND OF THE INVENTION

In wireless communication systems, base stations are traditionally equipped with a small number of antennas. A radically different approach involves base stations with an unprecedented numbers of antennas (M) simultaneously serving a much smaller number of mobile terminals (K where M>>K) using multi-user beamforming. Operating with a large ratio of antennas to terminals under simultaneous service can yield large increases in both spectral efficiency and energy efficiency. As the number of service antennas increases and power is reduced the most simple signal processing, conjugate beamforming on the forward link and matched-filtering on the reverse link, asymptotically achieves near-optimal performance.

One technical challenge associated with large antenna array (LSAS) networks is access (e.g., timing acquisition, cell search, paging, etc.), particularly if the base station power is significantly reduced compared to conventional base stations. The LSAS base stations typically do not know the channel state information for terminals, and this makes achieving a reasonable closed-loop beam forming gain difficult. As a result, convention push-based broadcast operations, such as broadcasting system and timing synchronization information (also called cell search), paging, etc., do not fit well with low power LSAS based networks.

SUMMARY OF THE INVENTION

At least one example embodiment eliminates having to broadcast system and/or synchronization information.

At least one example embodiment eliminates having to broadcast paging messages.

At least one embodiment is directed to a method of accessing a wireless network.

In one embodiment, this method includes sending, from a terminal, a random access request; and receiving, at the terminal, system information from a base station via a unicast transmission in response to the random access request. The system information includes an identifier, uplink bandwidth information and downlink bandwidth information. The identifier identifies the base station, the uplink bandwidth information indicates a bandwidth to use for uplink transmission, and the downlink bandwidth information indicates a bandwidth used for downlink transmission.

In one embodiment, the random access request is prepended with a random access pilot.

In another embodiment, the receiving system information, receives system information from a plurality of base stations. Here, the method further includes selecting one of the plurality of base stations, sending a selection message to the selected base station, and receiving additional system information from the selected base station. For example, the additional system information may include at least one of uplink configuration information, downlink configuration information, uplink power control information, etc.

In one embodiment, the receiving receives timing information and the system information from the base station via the unicast transmission in response to the random access request, and the timing information indicates a timing correction for the terminal to make for receiving downlink transmissions.

In another embodiment, method of accessing a wireless network includes receiving, at a base station, a random access request from a terminal; and selectively sending, by the base station, system information associated with the base station via a unicast transmission. The system information includes an identifier, uplink bandwidth information and downlink bandwidth information. The identifier identifies the base station, the uplink bandwidth information indicates a bandwidth to use for uplink transmission, and the downlink bandwidth information indicates a bandwidth used for downlink transmission.

For example, the selectively sending may determine whether to send the system information based on an estimated quality of a channel over which the random access request was received.

In one embodiment, this method further includes receiving a selection message from the terminal, and sending additional system information in response to the selection message. For example, the additional system information may include at least one of uplink configuration infatuation, downlink configuration information, uplink power control information, etc.

In one embodiment, the receiving receives the random access request on a channel orthogonal to data channels associated with the base station. In another embodiment, the receiving receives the random access request on a same channel as at least one data channel associated with the base station.

In another embodiment of a method of accessing a wireless network, the method includes sending, from a terminal, a polling message, the polling message indicating the terminal is polling for incoming calls.

In one embodiment, the method may further include re-sending the polling message after implementing a collision avoidance adjustment.

In another embodiment, the method may include receiving, from a terminal, a polling message. The polling message indicates the terminal is polling for incoming calls. A call connection is established with the terminal in response to the polling message if the base station has an incoming call for the terminal.

At least one embodiment relates to a method of decoding uplink transmissions.

In one embodiment, this method includes decoding first random access pilots having a received power above a first threshold, canceling the decoded random access pilots from a received signal to produce a first resulting signal, decoding scheduled transmissions in the first resulting signal, canceling the decoded scheduled transmissions from the first resulting signal to produce a second resulting signal, and decoding first random access requests in the second resulting signal. The first random access requests are associated with the decoded first random access pilots.

In one embodiment, the method further includes canceling the decoded first random access requests from the second resulting signal to produce a third resulting signal, decoding second random access pilots having a received power below a second threshold from the third resulting signal, and decoding second random access requests from the third resulting signal. The second random access requests are associated with the second random access pilots.

The canceling in the method may be performed in the digital domain or the analog domain.

Still further, the order of the decoding and canceling steps may be changed.

At least one embodiment is related to a wireless device such as a terminal or base station implementing one of the above described method embodiments.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
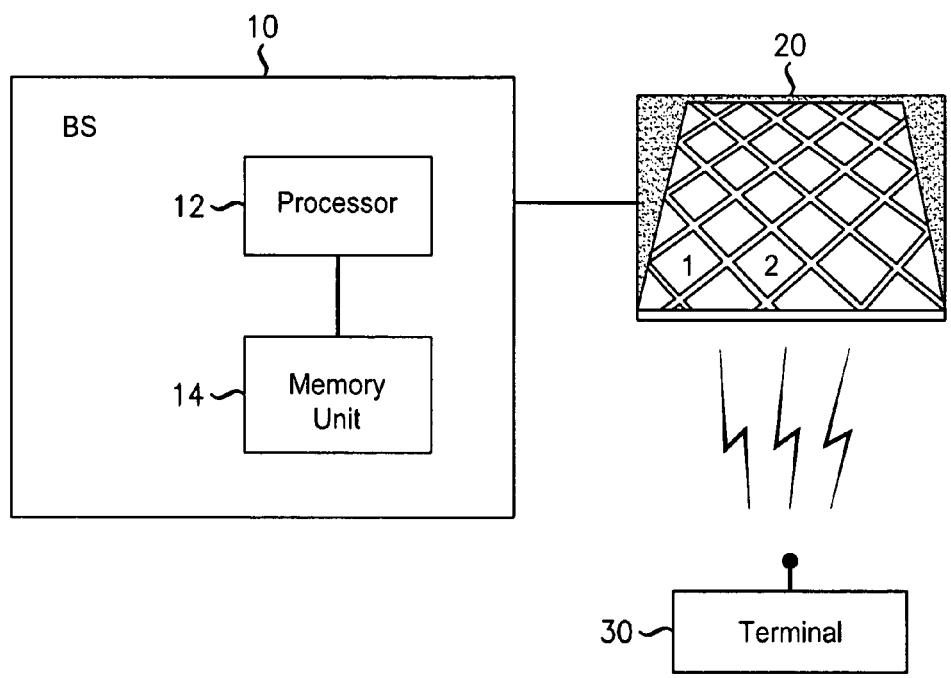
FIG. 1 illustrates a portion of a wireless communication system according to an embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the for in of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "terminal" may be synonymous to a mobile user, mobile station, mobile terminal, user, subscriber, wireless terminal, user equipment or UE, and/or remote station and may describe a remote user of wireless resources in a wireless communication network. Accordingly, a terminal may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the terminal is typically called downlink or forward link communication. Communication from the terminal to the base station is typically called uplink or reverse link communication.

Architecture

FIG. 1 illustrates a portion of a wireless communication system according to an embodiment. As shown, a base station 10 has a large antenna array 20 of M antennas. For example, M may be 100 antennas, but is not limited to this number. The base station 10 also includes a processor 12 (e.g., a digital signal processor), and a memory unit 14. The memory unit 14 may be any well-known storage medium or combination thereof. The processor 12 controls operation and function of the base station 10, and stores data, etc. in the memory unit 14. The operation of the base station 10 will be described in greater detail below. FIG. 1 also illustrates a terminal 30 in the coverage area of the base station 10. As will be appreciated, numerous terminals may be within the coverage area of the base station 10.

Figure 2:
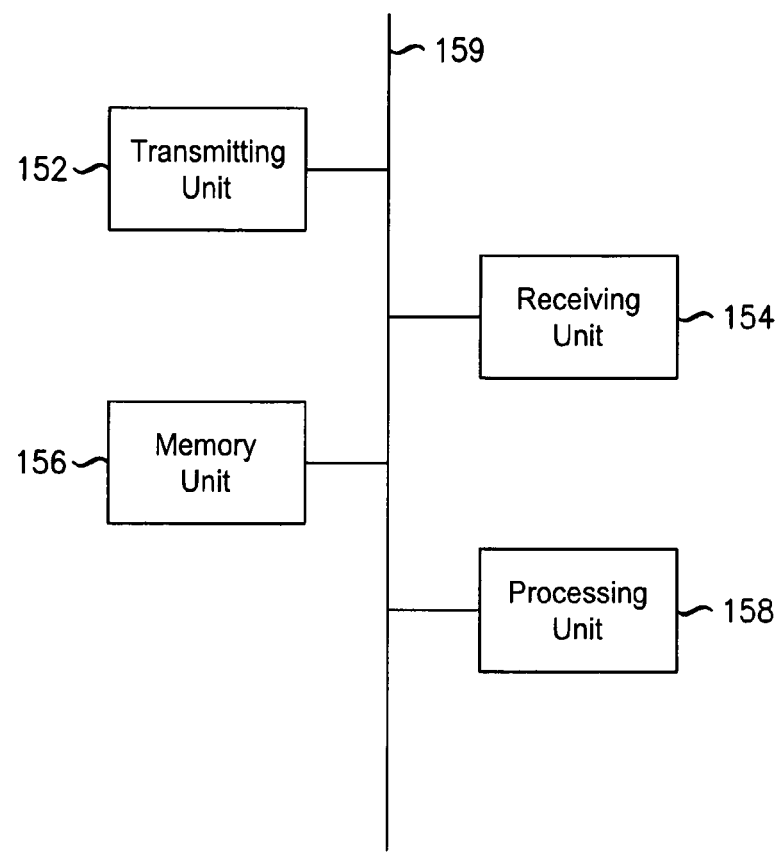
FIG. 2 is a diagram illustrating an example structure of a wireless device.

FIG. 2 is a diagram illustrating an example structure of a wireless device. The wireless device 151 may be terminal 30 shown in FIG. 1. The wireless device 151 may include, for example, a data bus 159, a transmitting unit 152, a receiving unit 154, a memory unit 156, and a processing unit 158.

The transmitting unit 152, receiving unit 154, memory unit 156, and processing unit 158 may send data to and/or receive data from one another using the data bus 159. The transmitting unit 152 is a device that includes hardware and any necessary software for transmitting wireless signals including, for example, data signals, control signals, and signal strength/quality information via one or more wireless connections to other wireless devices (e.g., base stations).

The receiving unit 154 is a device that includes hardware and any necessary software for receiving wireless signals including, for example, data signals, control signals, and signal strength/quality information via one or more wireless connections from other wireless devices (e.g., base stations).

The memory unit 156 may be any storage medium capable of storing data including magnetic storage, flash storage, etc.

The processing unit 158 may be any device capable of processing data including, for example, a microprocessor configured to carry out specific operations based on input data, or capable of executing instructions included in computer readable code.

For example, the processing unit 158 is capable of implementing the methods described in detail below.

Operation

By using a large number of antennas, a large antenna array (LSAS) base station should be able to reduce the transmit power per antenna to a few Watts or even lower. Therefore, a LSAS base station antenna no longer needs the power amplifier of very high power consumption or the concomitant expensive cooling equipment. However, cellular networks also have broadcast operations. For example, timing synchronization (also known as cell search) and paging typically require broadcast operation.

Since the base station has no knowledge of the channels of unknown terminals before those terminals become active, the base station can not make use of close-loop beamforming to improve gain. As a result, convention push-based broadcast operations, such as broadcasting system or timing synchronization information (also called cell search), paging, etc., do not fit well with low power LSAS based networks.

Figure 3:
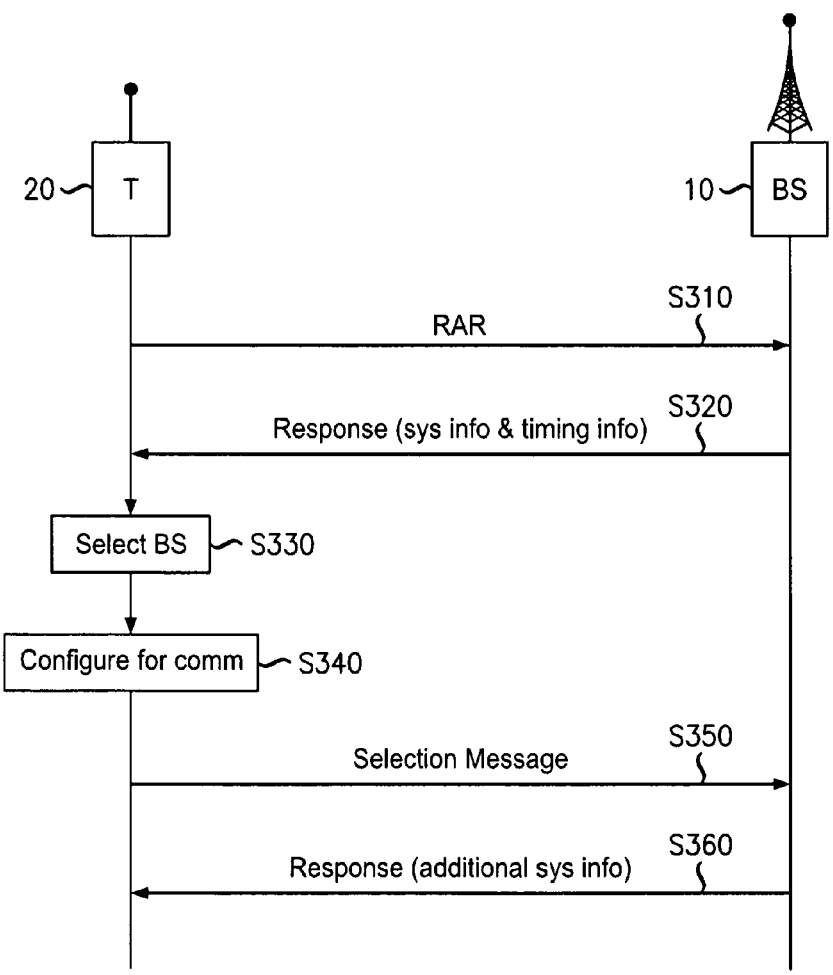
FIG. 3 illustrates a communication flow diagram for a method of accessing a wireless network according to an embodiment.

Next, a pull-based method of obtaining system information and timing synchronization will be described with respect to FIG. 3. FIG. 3 illustrates a communication flow diagram for a method of accessing a wireless network according to an embodiment. For the purposes of explanation, the method will be described assuming a long term evolution (LIE) wireless network.

As shown, the terminal 30 (e.g., under the control of the processing unit 158 in terminal 30) sends a random access request (RAR) in step S310. The random access request may be pre-pended with a random access pilot. For example, the terminal 30 may be pre-configured with a set of random access pilots, select one of the random access pilots from the set, and pre-pend the selected random access pilot to the RAR. Still further, the random access pilot may be sent at a high power level as compared to other transmissions. The high power level may be a design parameter set based on empirical study. The RAR identifies the mobile and indicates set up or activation of the terminal 30 to the base station 10. Since the terminal 30 does not know any of the system information for the base station 10, the terminal 30 configures the RAR based on pre-configured system parameters. For example, the pre-configured system parameters may include a minimum bandwidth available to base stations, carrier frequencies of base stations, etc.

Base stations, such as base station 10, receiving the RAR determine whether to send a response to the terminal 30. For example, the base stations may determine a quality of the uplink channel based on the received RAR, and determine to send a response if a quality threshold is exceeded. As a further example, base stations may alternatively or additionally determine to send a response only if a congestion at the base station is less than a congestion threshold. These thresholds may be design parameters set based on empirical study.

Assuming base station 10 determines to send a response, the base station unicasts a response, as shown in step S320. The response includes basic system information and timing information. The basic system information is basic information for the terminal 30 to be able to communicate with the base station 10. For example, the basic system information includes an identifier of the base station 10, uplink bandwidth to use when communicating with the base station 10, and the downlink bandwidth used by the base station 10. Accordingly, the base station 10 may send this basic information using a minimal amount of bandwidth. The timing information indicates a timing correction, for example a timing advance command, to correct and/or synchronize the timing of the terminal 30 with that of the base station 10.

The terminal 30 may receive a response to the RAR from more than one base station. Accordingly, in step S330, the terminal selects one of the responding base stations 10. For example, the terminal 30 may select the responding base station having the highest received signal strength. For the purposes of explanation, in FIG. 3, selection of base station 10 is assumed. The terminal 30 then configures for communication with the base station 10 using the basic system information and the timing information in step S340. For example, a timing adjustment is made based on the timing information, and future transmissions use the basic system information. In particular, in step S350, the terminal 30 sends a selection message to the base station 10. The selection message indicates the base station 10 has been selected by the terminal 30 to handle/serve communication needs of the terminal 30.

In response to the selection message, in step S360, the base station 10 sends additional system information. The additional system information may include uplink configuration information, downlink configuration information, uplink power control information, etc. The terminal 30 will use this information to better configure (e.g., set up) communication with the base station 10.

Accordingly, in this embodiment, the base station 10 does not broadcast system and timing information to the terminal 30. Instead of such a push based system, the terminal 30 pulls this information from the base station 10, and the terminal 30 receives the information via unicast.

As will be appreciated, instead of receiving the system information over two responses, the first response in step S320 may include the basic and additional system information.

Furthermore, once this initial set up of communication with the terminal takes place, other random access by the terminal may use low power random access pilots.

Still further, while described with respect to LTE where the RAR is sent over a same channel as a data channel associated with the base station, other variations are possible. For example, the RAR may be sent over a channel orthogonal to data channels associated with the base station. As examples, a separate code in CDMA, a different frequency band, a different resource block in OFDM, etc. may be used for the RAR. With a random access channel orthogonal to data channels, random access messages can be decoded independent of any data channel transmissions.

Next a method of decoding at the base station according to various embodiments will be described. This method assumes that one or more terminals are employing the pull based method for cell access described above.

Figure 4:
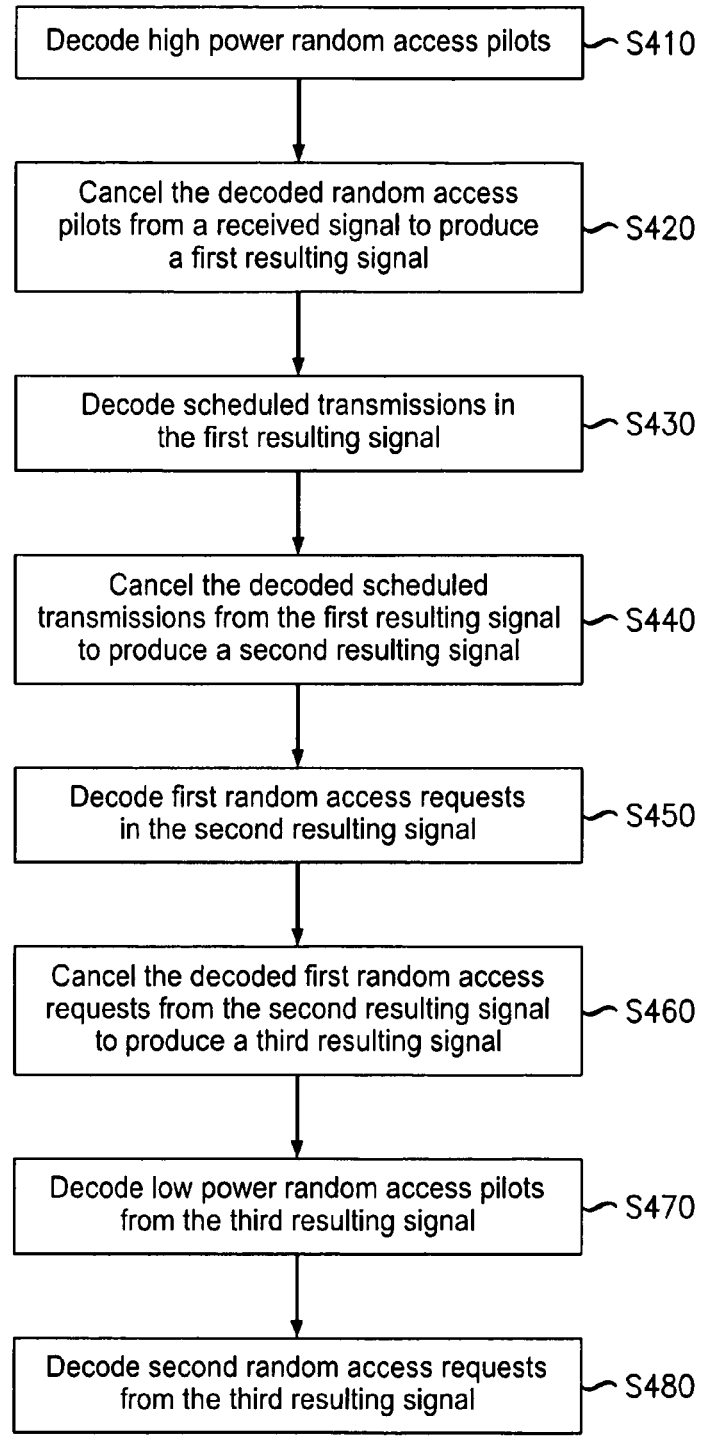
FIG. 4 illustrates a method of decoding according to a first embodiment.

FIG. 4 illustrates a method of decoding according to a first embodiment. As shown, if the base station 10 detects high power random access pilots in a received signal, then in step S410, the base station 10 decodes the high power random access pilots. The high power random access pilots may be first random access pilots having a received power above a first threshold. For example, the high power random access pilots may be those sent by terminals such as in step S310 with the RAR. Also, the first threshold may be a design parameter set based on empirical study. The base station 10 cancels the decoded random access pilots from the received signal to produce a first resulting signal in step S420. The base station then decodes scheduled transmissions in the first resulting signal in step S430, and cancels the decoded scheduled transmissions from the first resulting signal to produce a second resulting signal in step S440.

Next, the base station 10 decodes random access requests associated with the decoded high power pilots in the second resulting signal in steps S450. For example, RAR sent in step S310 are decoded. These decoded random access requests are canceled from the second resulting signal to produce a third resulting signal in step S460. The base station 10 decodes low power random access pilots having a received power below a second threshold from the third resulting signal in step S470, and then decodes the RAR associated with these low power pilots in step S480. For example, these low power RAR may be associated with random accesses not involving set up of a terminal. Also, the second threshold may be a design parameter set based on empirical study.

Figure 5:
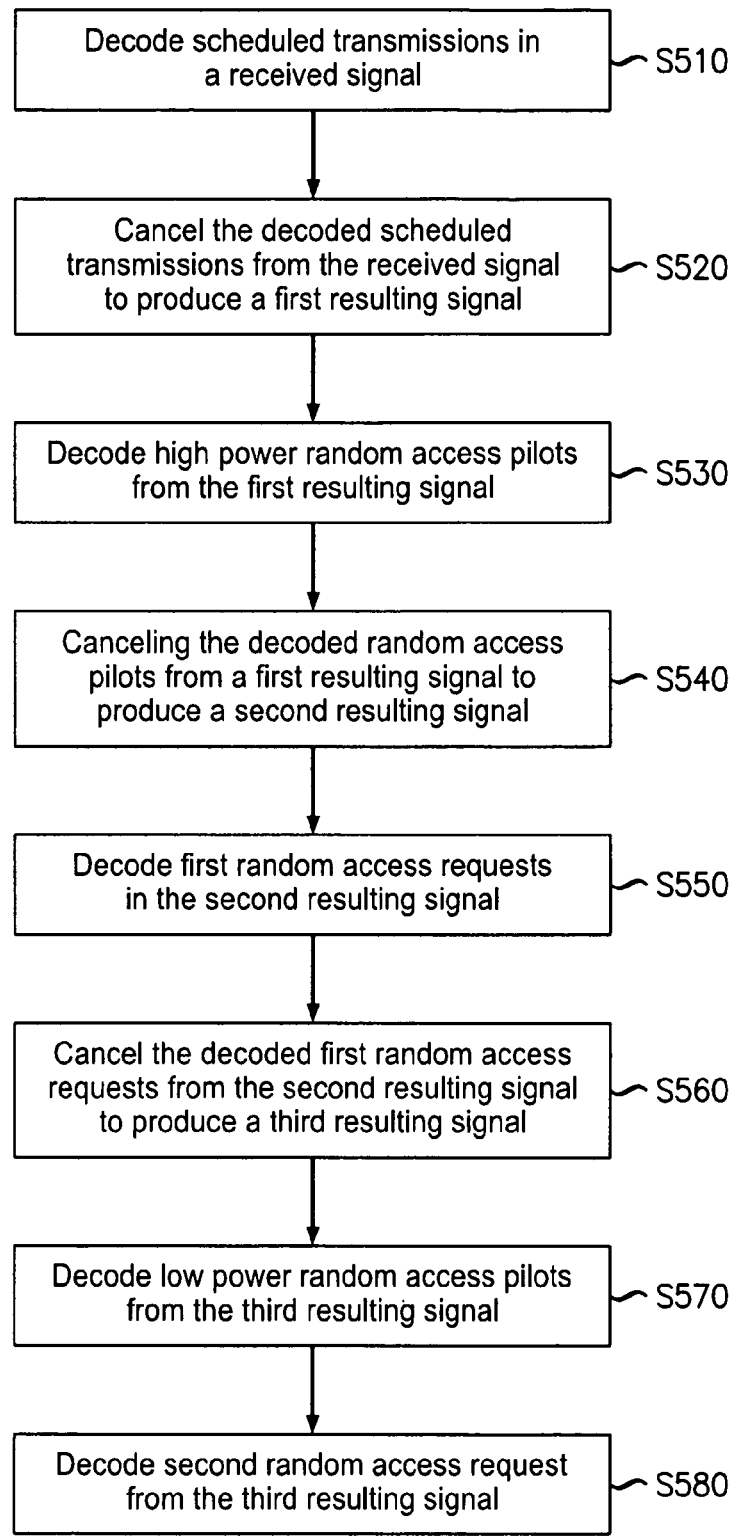
FIG. 5 illustrates a method of decoding according to a second embodiment.

As will be appreciated, the method of decoding described above is not limited to the order in which the steps are performed. For example, FIG. 5 illustrates another embodiment of the method of decoding in which the steps are performed in a different order. For example, decoding and cancellation of scheduled transmission takes place before decoding and cancellation of the high power pilots.

Figure 8:
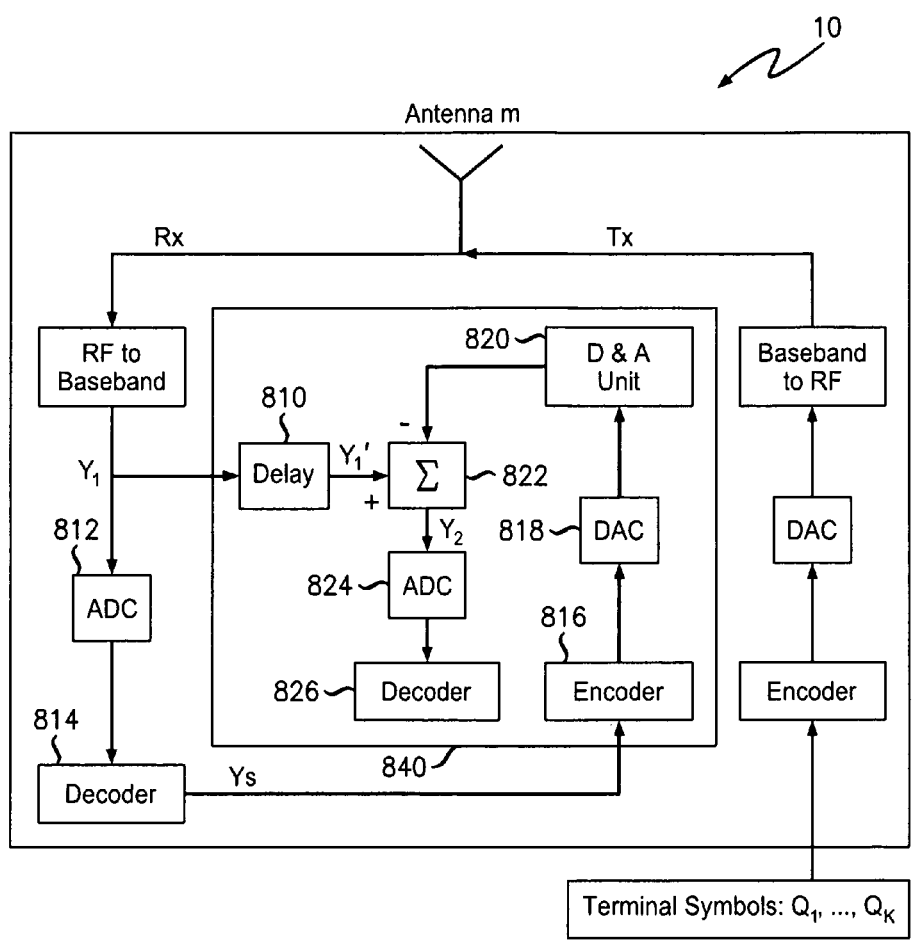
FIG. 8 illustrates a portion of base station 10 configured to perform cancellation in the analog domain.

In the example embodiments described above, the canceling steps may be performed in the digital domain or in the analog domain. FIG. 8 illustrates a portion of base station 10 configured to perform cancellation in the analog domain. As shown, to accomplish analog domain subtraction, a delay 810 delays the received analog signal y1 to produce a delayed signal y'1. Meanwhile, a first analog-to-digital converter (ADC) 812 converts the base band signal y1 to digital, and a decoder 814 decodes signals in the base band signal y1. For example, the decoder 814 may decode a scheduled signal ys. The decoded scheduled signal may then be re-encoded by encoder 816, converted to analog by digital-to-analog converter (DAC) 818, and subtracted from the delayed received signal y1' by a combiner 822 after undergoing delay and attenuation by delay and attenuation unit 820 to time align the signal with the delayed received signal y1'. The combiner 822 outputs a resulting signal yd.

A second ADC 824 converts the resulting signal yd to digital, and a decoder 826 decodes further signals from the resulting signal. For example, high power pilots may be decoded from the resulting signal yd.

The cancellation structure 840 described above, may be replicated numerous times in the base station 10 to perform the cancellations described above with respect to FIGS. 4 and 5. And, as previously mentioned, instead of operating in the base band, the cancellation may be performed with respect to RF signals.

Next a method of polling for incoming calls will be described with respect to FIGS. 6 and 7. As will be appreciated, since the base station 10 does not broadcast information to the terminals, the base station 10 does not page a terminal 30 when an incoming call for the terminal 30 is received. Instead, the terminal 30 polls the base station 10 for incoming calls.

Figure 6:
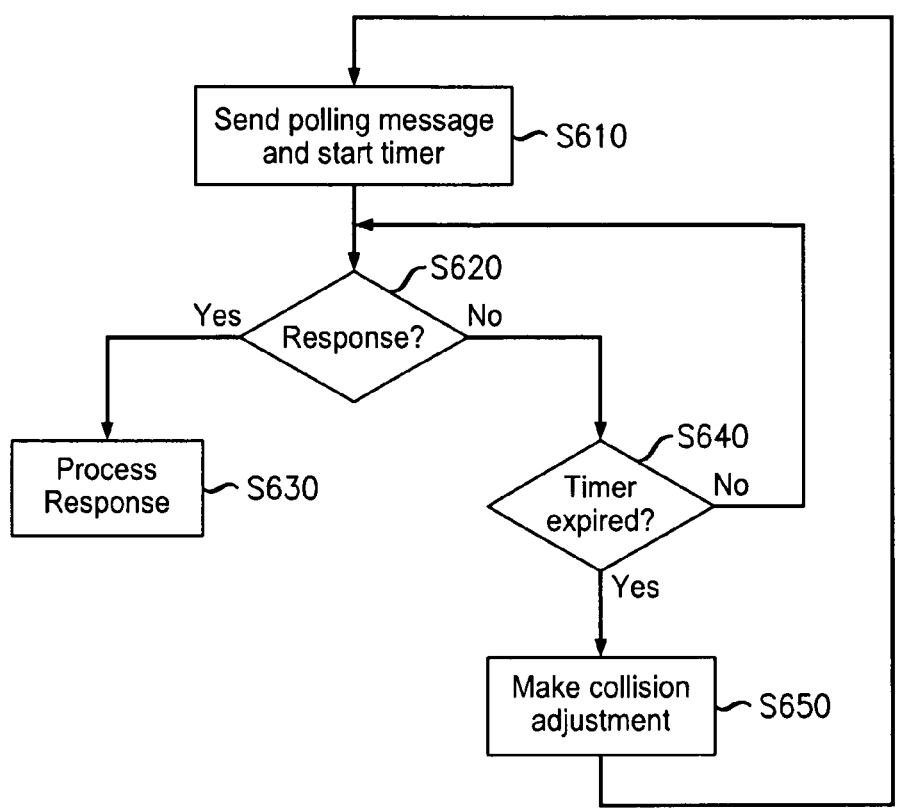
FIG. 6 illustrates operation at the terminal in polling for incoming calls according to an embodiment.

FIG. 6 illustrates operation at the terminal in polling for incoming calls according to an embodiment. As shown, in step S610, the terminal 30 sends a polling message to the base station 10 serving the terminal 30. The polling message may be a random access request indicating the terminal is polling for incoming calls. The terminal 30 may also set a timer. In step S620, the terminal 30 determines if a response to the polling message has been received from the base station 10. The response may be an acknowledgment of receipt, confirmation of an incoming call, start of a call connection process, etc. If a response is received, then in step S630 the terminal 30 processes the response based on the response received.

However, if no response is received, then the terminal 30 determines in step S640 if the timer set in step S610 has expired. If not, processing returns to step S620. If the timer has expired, the terminal 30 judges that the polling message failed. Failure may occur due to collision with the transmissions of other terminals, or a host of other reasons such as insufficient power, etc. Accordingly, the terminal 30 may invoke a collision adjustment in step S650. For example, the adjustment may be to increase transmission power and then return to step S610. As another example, the terminal 30 may wait some random period of time and then return to step S610. Also, the terminal 30 may invoke more than one adjustment. Additionally, in order to aid in avoiding collision, the base station 10 may schedule polling message transmissions by the terminals.

Figure 7:
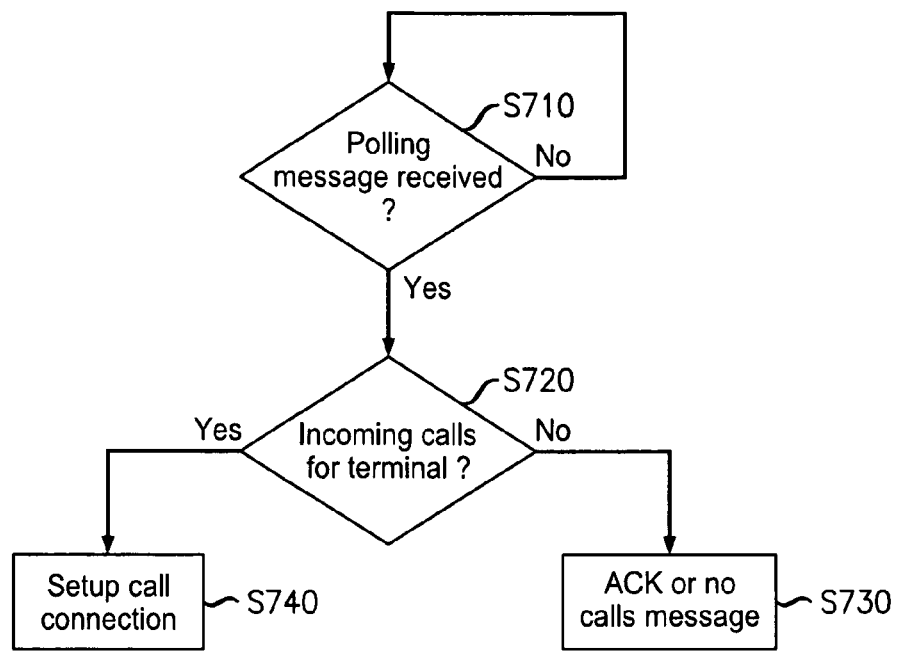
FIG. 7 illustrates operation at the base station in response to being polled by a terminal for incoming calls.

FIG. 7 illustrates operation at the base station in response to being polled by a terminal for incoming calls. As shown, the base station 10 determines if a polling message is received in step S710. For example, the base station 10 determines if a decoded RAR from terminal 30 indicates the terminal 30 is polling for incoming calls. If no, processing returns to step S710.

If a terminal is polling for incoming calls, then the base station determines in step S720 if an incoming call for the terminal exists. If not, then the base station 10 sends an acknowledgement of the polling message or sends a response message indicating no incoming calls. For example, acknowledgement of the polling message may be established to indicate no incoming calls. If an incoming call does exist, then the base station 10 sets up a call connection with the terminal 30.

By implementing the polling methodology described above, the base station does not broadcast paging messages.

The example embodiments being thus described, it will be obvious that the same may be varied in many ways. Such variations are not to be regarded as a departure from the invention, and all such modifications are intended to be included within the scope of the invention.

We claim:

1. A method of accessing a wireless network, comprising:
    configuring, by a terminal, a random access request based on system parameters determined without receiving signaling and timing information from a plurality of base stations;
    sending, from the terminal, the random access request to the plurality of base stations, the plurality of base stations not having knowledge of channels of the terminal, the random access request identifying the terminal to the plurality of base stations and being pre-pended with a random access pilot;
    receiving, at the terminal, system information from the plurality of base stations via unicast transmissions in response to the random access request, the system information including an identifier, uplink bandwidth information and downlink bandwidth information, the identifier identifying a respective one of the plurality of base stations, the uplink bandwidth information indicating a bandwidth to use for uplink transmission, the downlink bandwidth information indicating a bandwidth used for downlink transmission;
    selecting one of the plurality of base stations having a highest received signal strength at the terminal;
    sending a selection message to the selected base station; and
    receiving additional system information from the selected base station, the additional system information including at least one of uplink configuration information, downlink configuration information, and uplink power control information.

2. The method of claim 1, further comprising:
    selecting a random access pilot from a plurality of pre-configured random access pilots; and wherein
    the sending pre-pends the selected random access pilot to the random access request.

3. The method of claim 1, wherein the receiving receives timing information and the system information from the plurality of base stations via the unicast transmissions in response to the random access request, the timing information indicating timing correction for the terminal to make for receiving downlink transmissions.

4. The method of claim 1, wherein the terminal does not obtain system information from a broadcast transmission.

5. A method of accessing a wireless network, comprising:
    receiving, at a base station, a random access request from a terminal, the base station being one of a plurality of base stations in the wireless network, the random access request being received from the terminal without the base station sending any signaling information and timing information to the terminal, the random access request being pre-pended with a random access pilot; and
    selectively sending, by the base station, system information to the terminal via a unicast transmission in response to receiving the random access pilot, the system information associated with the base station and including an identifier, uplink bandwidth information and downlink bandwidth information, the identifier identifying the base station, the uplink bandwidth information indicating a bandwidth to use for uplink transmission, the downlink bandwidth information indicating a bandwidth used for downlink transmission;
    receiving, at the base station, a selection message from the terminal, if transmissions from the base station have a highest received signal strength at the terminal among transmissions from the plurality of base stations; and sending, from the base station, additional information to the terminal in response to receiving the selection message therefrom, the additional information including at least one of uplink configuration information, downlink configuration information, and uplink power control information.

6. The method of claim 5, wherein the selectively sending determines whether to send the system information based on an estimated quality of a channel over which the random access request was received.

7. The method of claim 5, wherein the receiving receives the random access request on a channel orthogonal to data channels associated with the base station.

8. The method of claim 5, wherein the receiving receives the random access request on a same channel as at least one data channel associated with the base station.

9. A wireless device, comprising:
a receiver unit configured to receive data;
a transmitting unit configured to transmit data;
a memory unit configured to store information; and
a processing unit coupled to the transmitting unit, the receiving unit, and the memory unit, the processing unit configured to,
configure a random access request based on system parameters determined without receiving signaling and timing information from a plurality of base stations, send the random access request to the plurality of base stations, the plurality of base stations not having knowledge of channels of the terminal, the random access request identifying the terminal to the plurality of base stations and being pre-pended with a random access pilot, receive system information from the plurality of base stations via unicast transmissions in response to the random access request, the system information including an identifier, uplink bandwidth information and downlink bandwidth information, the identifier identifying a respective one of the plurality of base stations, the uplink bandwidth information indicating a bandwidth to use for uplink transmission, the downlink bandwidth information indicating a bandwidth used for downlink transmission, selecting one of the plurality of base stations having a highest received signal strength at the terminal, sending a selection message to the selected base station, and receiving additional system information from the selected base station, the additional system information including at least one of uplink configuration information, downlink configuration information, and uplink power control information.

* * * * *